March 6, 1951 — G. TOMFOHRDE — 2,544,191
CONVEYER FOR MANURE DISPOSAL SYSTEMS
Filed July 20, 1944 — 2 Sheets-Sheet 1

INVENTOR
GILBERT TOMFOHRDE
BY Wheeler, Wheeler & Wheeler
ATTORNEYS.

INVENTOR.
GILBERT TOMFOHRDE
BY
Wheeler, Wheeler & Wheeler
ATTORNEYS

Patented Mar. 6, 1951

2,544,191

UNITED STATES PATENT OFFICE 2,544,191

CONVEYER FOR MANURE DISPOSAL SYSTEMS

Gilbert Tomfohrde, Arpin, Wis.

Application July 20, 1944, Serial No. 545,851

7 Claims. (Cl. 198—176)

This invention relates to improvements in manure disposal systems.

It is the primary object of the invention to provide novel and simple non-clogging means for disposing of manure and barn refuse with little time and labor.

It is a further object of the invention to provide apparatus for these purposes which may readily be installed in existing barn structures to operate in existing troughs, whereby such troughs become a part of the disposal system.

It is a further object of the invention to provide a disposal system in which, by simply pushing a switch button, a small child can effectively remove all manure from the barn and deliver it, without effort, to a suitable point of disposal.

Other objects include the provision of a novel conveyor having an arm in detachable connection with a conventional chain, whereby either the arm or portions of the chain may readily be replaced, as required.

Another object of the invention is to provide a novel conveyor arm arrangement in which the desired scraping relationship between the arm and the floor of a conveyor trough is maintained by the weight and resistance of the material upon which the arm acts.

Another object of the invention is the provision of a manure disposal system in which the manure rests directly in and upon the trough commonly provided therefor, the propelling conveyor having its operating parts sufficiently free of the bottom of such trough so that there is no tendency for the conveyor to become unduly loaded or clogged, or otherwise adversely affected by accumulations of manure or litter.

In the drawings.

Like parts are designated by the same reference characters throughout the several views.

Figure 1:
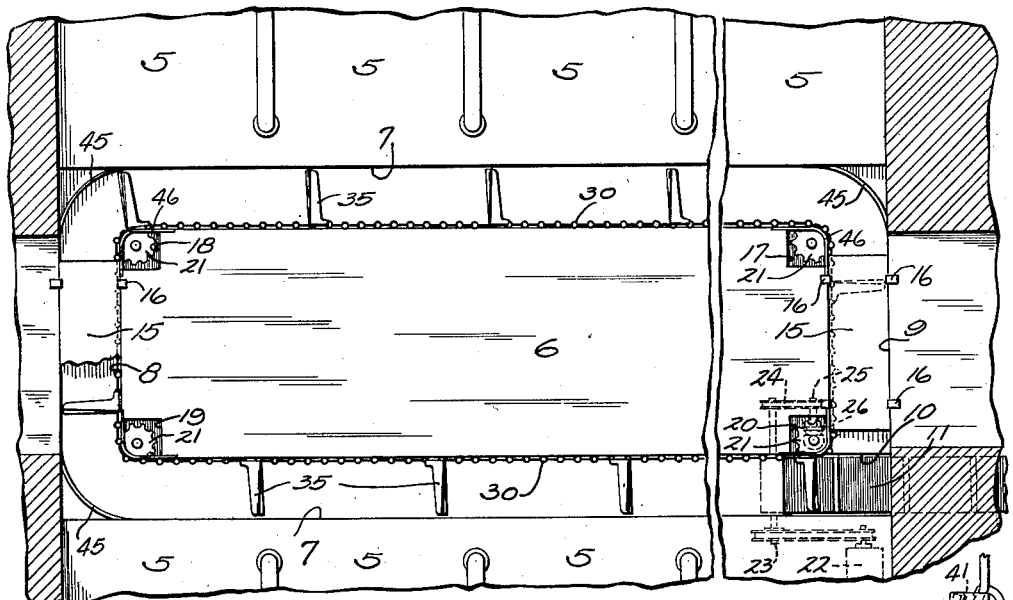
Fig. 1 is a fragmentary plan view diagrammatically illustrating the disposal system embodying the invention.

Fig. 1 shows, in plan, a conventional dairy barn arrangement, portions being broken away so that only eight stalls 5 are illustrated (four on each side of the central aisle 6). It will, of course, be understood that the barn may have any desired length. Between the stalls 5 and the aisle 6 are conventional troughs 7 to receive manure and litter from the animals in the respective stalls.

In accordance with the present invention, the troughs 7 are cross-connected at the ends of the barn by troughs 8, 9, and a pit is provided at 10 with which the trough system communicates. Within this pit operates a conveyor 11 of the belt and cleat type, or other suitable construction, the purpose of this conveyor being to remove, from the bran to a suitable point of disposal, the manure delivered into the pit by the conveyor system herein described. In practice, it has been found desirable to have the belt conveyor 11 discharge directly into a manure spreader, whereby, from time to time, the manure may be distributed on the fields, without ever having been handled.

Where, as in the illustrated organization, the aisle 6 is continued into doorways or the like, the troughs 8 and 9 may be bridged by suitable planks 15 provided at 16 with brackets for supporting them from the adjacent floor surface, the planks being preferably flush with the floor.

Figures 4, 5:
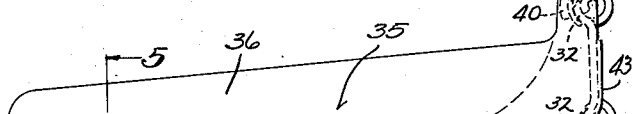
Fig. 4 is an end plan view, showing a detail of the propelling arm in its relation to a portion of the conveyor chain.
Fig. 5 is a view taken in section on the line 5—5 of Fig. 4.
Figures 2, 3:
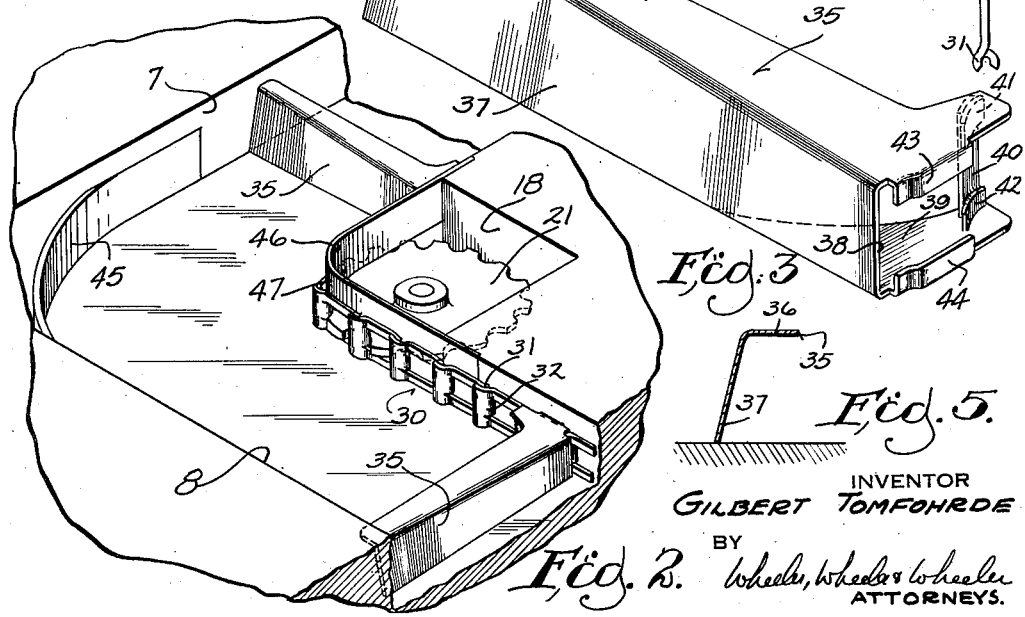
Fig. 2 is an enlarged detail, partially in section and partially in perspective, illustrating a corner of the conveyor system shown in Fig. 1.
Fig. 3 is an enlarged detail view in perspective, showing one of the propelling conveyor arms.

Recesses are provided at 17, 18, 19 and 20 in the four corners of the aisle surface near the points where the several troughs communicate with each other. In each of these recesses is disposed a horizontal sprocket 21, all of which are idlers with the exception of the sprocket in the recess 20, to which power is preferably applied from the motor 22 which drives the shaft 23 on which the pulley for the belt 11 is mounted. From the end of this shaft a chain 24 and drive shaft 25, together with miter gears at 26, drive the sprocket 21. A conveyor chain of any suitable type operates over the several sprockets 21, the chain 30 being arranged on each in immediate proximity to that side of each trough which is closest to the center aisle. The chain used in the illustration is of conventional design and is widely used on farm equipment and has been found suitable for the practice of this invention. It is designed to facilitate easy replacement of its several links in the event of breakage. At the point of pivotal connection between the links, the chain includes an arcuate portion 31 on one link lapped by an arcuate portion 32 on an adjacent link, as clearly shown both in Figs. 2 and 4. Integral portions of the respective links provide the fulcrum between links and the organization is such that by folding one link upon another, the fulcrum portion may be disengaged.

The manure propelling arms 35 may, in the broader aspect of this invention, be secured in any desired manner to selected lengths of the propelling chain 30. I have successfully practiced the invention by welding the arms to the links. However, for the specific purpose of the type of chain illustrated, I have found it desirable to employ a special arm construction, illustrated in detail in Figs. 3 and 4, the arm being made of a single piece of sheet metal having a top portion 36 and an obliquely inclined propelling portion 37 terminating in an inner margin at 38.

Figure 6:
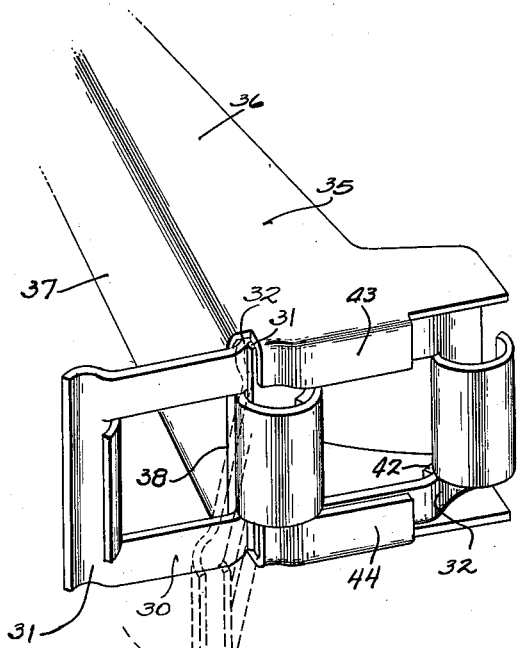
Fig. 6 is a fragmentary detail view in perspective on an enlarged scale showing two successive links of the propelling chain operatively engaged with the work propelling arm.

At the inner end of each propelling arm there is also a bottom wall at 39 which is connected with and serves to brace the lower edge of the obliquely inclined propelling wall 37. A strut 40 connects the portions of the top and bottom walls 36, 39, and preferably has pad portions 41, 42, for the pivotally connected portions of one of the chain links. The top wall 36 and the bottom wall 39 have, at their ends, overhanging flanges 43, 44, shaped to conform to the inner side of a chain link, of which the rear pivotal portion is engaged with the respective pads 41, 42. The arcuate rear pivotal portion 32 of the next preceding link of the chain will, thereupon, be engaged behind the margin 38 of the wall 37 as shown in Fig. 6 to preclude any possibility of movement of the propelling arm with respect to the link so engaged as long as the chain remains tensioned over the sprocket in condition for use. In effect, the flanges 43, 44 together with pads 41, 42 and the margin 38 at the end of the arm, constitute spaced upper and lower channels in which the upper and lower sides of the links are engaged to actuate the work propelling arm from the chain.

Figure 7:
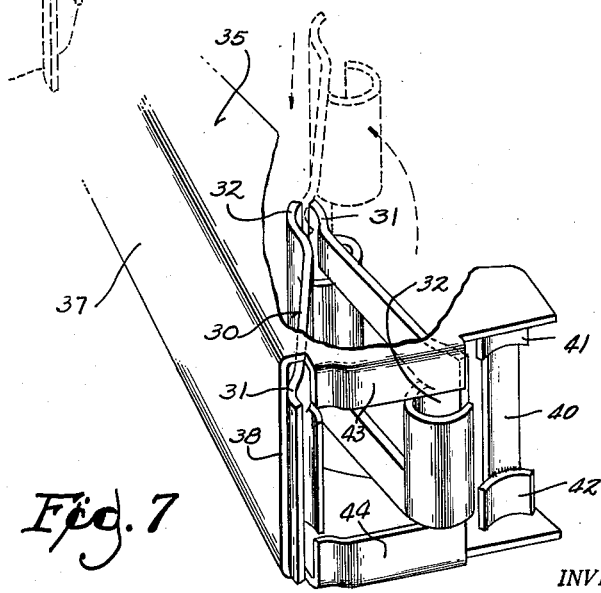
Fig. 7 is a fragmentary detail view similar to Fig. 6 showing the links manipulated respecting the arm to an intermediate position in process of their disconnection from the arm.

However, if the forward link, which immediately precedes the arm, is disconnected from the preceding portions of the chain and is folded back inwardly upon the link as shown in Fig. 7, it will be apparent that the arcuate portion 32 of such forward link will be moved pivotally from behind the margin 38 of the arm. This frees the subsequent link to swing inwardly to the position shown in dotted lines in Fig. 7. Thereupon, there will be sufficient clearance between the margin 38 and the flanges 43, 44, to permit the link engaged with such arm to be withdrawn from engagement. By a converse operation, the link may be re-engaged with the arm. Thus, the mounting and dismounting of the respective arms upon the chain is accomplished with facility for the replacement of arms or links, as may be required.

It is preferable, though not absolutely necessary, to guide the manure as it passes from one trough section to another at one of the corners. For this purpose, the outer side of the corner may be rounded concentrically with the upright pintle upon which each sprocket 21 operates. I prefer to do this by incorporating an arcuate baffle 45 in the trough system. Similarly, I may guard against the lodgement of manure in the recesses 17, 18, 19 and 20 by providing each recess with a plate 46, rounded at 47 and otherwise flush with the inner walls of adjacent trough sections. The plate 46 lies just above the sprocket 21 but extends below the level of the top of the chain 30. Thus, the chain and the plate together close off the recess 18 from the adjacent trough portions and exclude refuse. The chain, as will be understood, is carried by each sprocket parallel to and immediately adjacent the inner faces of the inner trough sections and approximately at the level of the trough floors, or just barely out of contact with the bottom of the troughs.

It is important to note that the troughs are at all times wide open to receive manure and litter, and that all such manure and litter falls directly on to the bottom of the trough from time to time, whenever removal of the manure and litter is desired, it is only necessary to start the motor 22 and to operate it for a sufficient period for the chain to make one complete circuit of the trough system. Thereupon, all of the manure and litter which has accumulated in the respective troughs 7 will be swept or scraped along the bottom of the troughs to the pit 10 and discharged into the pit upon the conveyor 11 which, being in simultaneous operation, will deliver the manure out of the barn. The pit 10 may be covered if desired but, for convenience of illustration, no cover is shown.

The cleanliness with which the system functions is greatly enhanced by two features of the invention. In the first place, there is no apron or belt or conveyor running along the bottom of the trough where manure may accumulate. Manure disposal systems involving such conveyors have never gone into general use because the manure tends to accumulate on the flexible apron in a manner which is not only unsightly and unsanitary, but tends to clog the operation of the conveyor.

The second feature of the present invention is the manner in which the respective propelling arms 35 successively scrape the bottom of the trough in each conveyor operation. As each arm accumulates a mass of manure and litter in front of it, the oblique inclination of the propelling surface 37 causes a downward thrust reaction upon the arm which impels the lower scraping edge of the wall portion 37 forcibly into contact with the bottom of the trough so that the trough is at all times kept exceptionally clean. Another feature contributing to the successful operation is the arrangement of the chain around the inside margin of the trough, where it is relatively free from contact with manure and litter and has proved to function successfully without clogging.

I claim:

1. In a conveyor of the character described, the combination with pivotally connected separable flat chain links, of a sheet metal arm provided adjacent said chain links with extensions both above and below said links and each having a terminal portion provided with integral means interlocked in detachable connection with both sides of at least one of said links, said arm comprising a work propelling surface projecting from said last mentioned link.

2. In a conveyor of the character described, the combination with pivotally connected separable flat chain links, of an arm having a work-propelling surface projecting outwardly from said last mentioned link and provided with a terminal portion with integral means detachably connected with said last link and including opposing surfaces between which said last link is interlockingly confined, said chain comprising a second link having a portion pivotally movable with respect to the link to which the arm is connected, said pivotally movable portion being interlockingly engaged with a portion of said arm to releasably position said arm upon the link with which it is connected, said arm being slidable from said link in a longitudinal direction when said second link portion is pivotally moved from interlocking engagement with the arm.

3. The device of claim 1, said arm comprising a top plate and an inclined face plate.

4. In a device of the character described, a propelling arm applicable to a chain of the type having rectangular links with open centers, each link having at one end a pintle portion and at the other end an arcuate terminal portion adapted for detachable connection with the pintle portion of a consecutive link, said arm comprising a work propelling plate having an inner end margin adapted to be presented to the chain, upper and lower walls extending rearwardly from the plate, pad means spaced inwardly and positioned to be engaged by the arcuate portion of one link, and flanges connected with the respective walls and directed toward each other for engaging an opposite face of such link, said flanges terminating in spaced relation to the said margin of said plate whereby the arcuate portion of a successive link may be releasably interlocked between said margin and said flanges to secure said arm, said arm being releasable upon manipulation of the arcuate portion last mentioned from its normal position between said flanges and said margin.

5. For use in a link chain conveyor of the character described, a work propelling arm comprising a sheet metal angle member with work-propeling and top re-enforcing flanges and a terminal portion provided with a bottom flange opposed to the top flange, chain link seats extending toward each other from the top and bottom flanges and spaced from the end of the work-propelling flange, and flanges disposed at the end of the work propelling flange and extending transversely respecting the work-propelling flange and spaced outwardly from said seats to provide upper and lower link-receiving channels between the seats and the transversely extending flanges.

6. In a conveyor of the class described, the combination with a chain comprising links with interlocked arcuate ends relatively pivotally movable and separable upon relative pivotal movement to extreme positions, of an arm projecting laterally from the chain and having a terminal portion detachably engaged by parts of first and second consecutive links, said portion comprising upper and lower link engaging channels each including outer flange means respectively extending along upper and lower margins of the second of said links, and opposed inner means spaced beyond the ends of the flange means and engaged respectively by link portions near corresponding ends of the respective links, the first of said consecutive links engaging said inner means forwardly of the interlocked ends of said links, whereby the said interlocked ends may be swung inwardly of the flange means between the spaced inner means to disengage the second link from the inner means engaged thereby and to free both said links for withdrawal between the flange means and the inner means normally engaged by the first said link.

7. The device of claim 6 in which the terminal portion of said arm comprises a web extending laterally from the chain and upper and lower walls connected to the web, the end of the web being provided with a bearing surface constituting the one of the spaced inner means engaged by said first link, pad means connected with said walls remote from the web and constituting the other of said spaced inner means and with which the said second link is normally engaged, the outer flange means being connected with the upper and lower walls.

GILBERT TOMFOHRDE.

REFERENCES CITED

The following references are of record in the file of this patent:

UNITED STATES PATENTS

| Number | Name | Date |
| --- | --- | --- |
| 743,070 | Garland | Nov. 3, 1903 |
| 1,699,334 | Petersen | Jan. 15, 1929 |
| 1,800,814 | Boldt | Apr. 14, 1931 |
| 1,821,440 | Levin | Sept. 1, 1931 |
| 1,975,717 | Harris | Oct. 2, 1934 |
| 2,109,899 | Cannon | Mar. 1, 1938 |
| 2,287,378 | Hapman | June 23, 1942 |
| 2,372,925 | Ball | Apr. 3, 1945 |